Patented Mar. 7, 1950

2,499,800

UNITED STATES PATENT OFFICE 2,499,800

AZO DYES FORMED FROM p-NITRO-ANILINES AND 2-HYDROXY-7-BENZO-(c) CARBAZOLES AND THEIR FORMATION ON THE FIBER

Joseph H. Trepagnier, Wilmington, Del., assignor to E. I. du Pont de Nemours & Company, Wilmington, Del., a corporation of Delaware No Drawing. Application June 27, 1947, Serial No. 757,686

10 Claims. (Cl. 8—46)

This invention relates to water-insoluble monazo dyes derived by suitably coupling certain diazotized primary arylamines of the benzene series with suitable 2-hydroxy-7-benzo-(c)-carbazoles which are represented by the formula

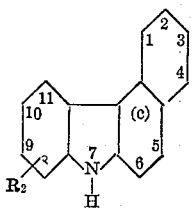

the coupling being in the position designated by the numeral 1 and $R_2$ being one of the group consisting of hydrogen, alkyl having 1 to 5 carbons, phenyl, chlorine and fluorine. The diazo components are para-nitroanilines carrying in the ortho position one of the group consisting of hydrogen, alkyl having 1 to 5 carbons, the corresponding alkoxy groups, chlorine and fluorine.

The production of fast brown shades on cellulose fibers by the azoic color process is relatively new to the art but has been accomplished heretofore by using arylamides of heterocylic orthohydroxy-carboxylic acids as coupling components but the making of these coupling components is laborious at best and calls for relatively elaborate expenditures of time and materials, thereby making the cost of the prior art dyes relatively high. Moreover, the coupling components heretofore used to make such prior art brown dyes are not entirely satisfactory for dyeing by the padding method because of their high substantivity and poor solubility.

I have now found that beautiful chocolate-brown shades of excellent tinctorial strength and fastness properties can be produced by the azoic color process on cellulosic fibers by forming monazo combinations in which the coupling components are any of the 2-hydroxy-7-benzo-(c)-carbazoles already described and the diazo components are any of the para-nitroanilines represented by the formula

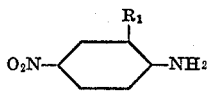

which are coupled in the position marked by the numeral 1 in the above formula of the carbazoles and in which $R_1$ is one of the group consisting of hydrogen, alkyl having 1 to 5 carbons, the corresponding alkoxy groups, chlorine and fluorine. The novel colors are readily and easily producible in that the 2-hydroxy-7-benzo-(c)-carbazole coupling components have excellent solubility and low substantivity which renders them especially suitable for the desired purpose. It is singular and surprising that the combinations of the present invention have such excellent properties in view of the fact that somewhat similar combinations of the prior art, wherein the diazo components are meta-nitroanilines as disclosed in U. S. P. 1,766,434, are unsatisfactory in that they are tinctorially weak and have poor fastness properties. The reasons for the superiority of the novel dye combinations are not understood, but the physical form of these pigments when produced on the fiber appears to be novel in that they form deep red solutions with organic solvents and the unsoaped dyeings are often deep red, undergoing a remarkable change of shade upon soaping and washing.

The invention will be more fully set forth in the following more detailed description which includes examples that are given as illustrative embodiments of the invention and not as limitations thereof. Parts are expressed in parts by weight unless otherwise noted.

Example 1

Fifteen parts of 2-hydroxy-7-benzo-(c)-carbazole are dissolved by pasting with a mixture of 30 parts of 30% caustic soda solution and diluting with water to 1000 parts. Cotton cloth is then padded with this solution and, after drying, developed with a solution of diazotized p-nitroaniline buffered at a pH between 3 and 5, for example, buffered with sodium acetate. After the usual soaping of the cloth a beautiful chocolate-brown dyeing is produced which has good washing, light- and chlorine-fastness. The combination of diazo and coupling components is represented by the formula

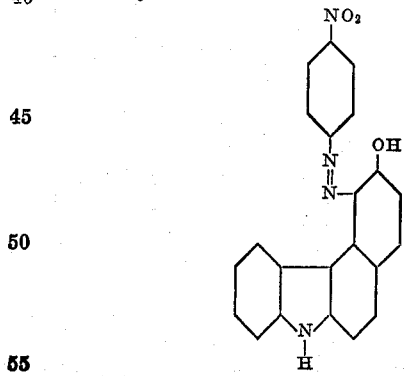

If, instead of diazotized p-nitroaniline, diazotized 5-nitro-2-aminoanisole, 5-nitro-2-aminotoluene or 4-nitro-2-chloroaniline is used in the procedure of the foregoing examples, beautiful chocolate-brown dyeings of good fastness properties are also produced.

By using 2-hydroxy-10-methyl-7-benzo-(c)-carbazole, 2-hydroxy-10-chloro-7-benzo-(c)-carbazole, 2-hydroxy-8-chloro-7-benzo-(c)-carbazole or 2-hydroxy-8-phenyl-7-benzo-(c)-carbazole in the procedure of the foregoing example instead of 2-hydroxy-7-benzo-(c)-carbazole, similar results are produced with any of the above diazotized amines. Such results are illustrated in the following Table I.

*Table I*

| Example | Coupling Component | Diazo Component | Shade |
|---|---|---|---|
| 2 | 2-Hydroxy-7-benzo-(c)-carbozole | 5-Nitro-2-amino-anisole | Chocolate-Brown. |
| 3 | ----do---- | 5-Nitro-2-amino-toluene | Do. |
| 4 | ----do---- | 4-Nitro-2-chloro-aniline | Do. |
| 5 | 2-Hydroxy-10-methyl-7-benzo-(c)-carbazole | p-Nitroaniline | Do. |
| 6 | ----do---- | 5-Nitro-2-amino-anisole | Do. |
| 7 | ----do---- | 5-Nitro-2-amino-toluene | Do. |
| 8 | 2-Hydroxy-10-chloro-7-benzo-(c)-carbazole | p-Nitroaniline | Reddish-Chocolate-Brown. |
| 9 | ----do---- | 5-Nitro-2-amino-anisole | Do. |
| 10 | ----do---- | 5-Nitro-2-amino-toluene | Do. |
| 11 | 2-Hydroxy-8-chloro-7-benzo-(c)-carbazole | p-Nitroaniline | Do. |
| 12 | ----do---- | 5-Nitro-2-amino-anisole | Do. |
| 13 | ----do---- | 5-Nitro-2-amino-toluene | Do. |
| 14 | 2-Hydroxy-8-phenyl-7-benzo-(c)-carbazole | p-Nitroaniline | Chocolate-Brown. |
| 15 | ----do---- | 5-Nitro-2-amino-anisole | Do. |

*Example 2*

Cotton broadcloth was printed with a paste containing 15 parts of 2-hydroxy-7-benzo-(c)-carbazole, 57 parts of the triazene prepared from diazotized p-nitroaniline and 2-ethylamino-5-sulfo-benzoic acid (purity 54%) and represented by the formula,

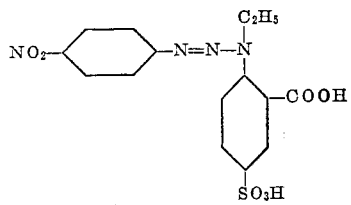

40 parts Cellosolve,
30 parts 32% caustic soda solution,
600 parts starch tragacanth thickener, and
258 parts water.

The print was dried, steamed in steam containing formic and acetic acid, soaped in a 160° F. soap solution, rinsed and dried. A beautiful chocolate-brown print of excellent light-, wash- and chlorine-fastness was produced. Similar results were obtained by using other 2-hydroxy-benzo-(c)-carbazoles of the general formula hereinabove set forth with triazenes (stabilized diazos) prepared from any of the specified diazotized p-nitroanilines and other 2-alkyl-amino-5-sulfo-benzoic acids.

The printing paste described in Example 16 may be somewhat more conveniently made by starting with a composition of the 2-hydroxy-7-benzo-(c)-carbazole and the triazene of the aniline. For this purpose, the triazene of any of the anilines used to make the dyes disclosed herein can be used as the triazene component. Preferably but not necessarily, an inert diluent, such as sugar or dextrine is incorporated into the composition. The following examples set forth the entire operation including an illustration of the preparation of the carbazole-triazene compositions. These compositions are especially convenient and useful in making up printing pastes for applying the dyes here described in that the proportions of the essential constituents can be regulated in a special operation apart from the dyehouse, thereby insuring the best conditions for dyeing.

*Example 3*

A finely divided powder is obtained by thoroughly stirring together the following previously prepared and stored dry powders. Each constituent of the powder was ground before mixing until 100% passed through a 40 mesh screen. A quantity of powdered composition for use in making a printing paste was made by thoroughly mixing together 15 parts of such powder of 2-hydroxy-7-benzo-(c)-carbazole,
57 parts of such powder of the triazene prepared from diazotized p-nitro-aniline and 2 ethylamino-5-sulfo-benzoic acid (purity 47%), and
28 parts of such powder of an inert diluent (such as sugar). In this mixture the coupling component and the triazene are in about equimolecular proportion.

In making a printing paste of this dry composition 100 parts of the above mixture,
40 parts of Cellosolve,
30 parts of 32% caustic soda solution,
600 parts of starch tragacanth thickener, and
230 parts water were mixed together until uniform. Cotton broadcloth was then printed with the paste. The print was dried, steamed in steam containing formic and acetic acid, soaped in a 160° F. soap solution, rinsed and dried. A beautiful chocolate-brown print of excellent light wash and chlorine fastness was produced. Although in the above example the ratio of the triazene to coupling component was slightly greater than mol for mol, the printing paste will operate when these constituents are present in other proportions. However, when the mixture of the carbazole and the triazene are made beforehand, the most desirable conditions can be maintained. Similar results can be obtained using other 2-hydroxy-7-benzo-(c)-carbazoles and other triazenes prepared from diazotized p-nitroanilines and other 2-alkylamino-5-sulfo-benzoic acids.

*Example 4*

Instead of a dry mixture, a solution composed essentially of the carbazole and the triazene may be used for preparing the paste. Thus a solution was prepared by stirring together 12 parts of 2-hydroxy-7-benzo-(c)-carbazole 47 parts of a triazene obtained from diazotized p-nitroaniline and 2-ethylamino-5-sulfobenzoic acid (purity 41%)
15 parts of 30% sodium hydroxide solution
126 parts of water (if desired, instead of water in the above preparation, a mixture of water and a water miscible solvent—e. g. ethyl alcohol or Cellosolve—may be used).

Cotton broadcloth was then printed with a paste containing 200 parts of the above solution
600 parts of starch tragacanth thickener
200 parts water The print was dried, steamed in steam containing formic and acetic acid, soaped in a 160° F. soap solution, rinsed and dried. A beautiful chocolate-brown print of excellent light wash and chlorine fastness was produced.

*Example 5*

Fifteen parts of 2-hydroxy-7-benzo-(c)-carbazole were dissolved by pasting with a mixture of 30 parts of 30% caustic soda solution and diluting with water to 1000 parts. A portion of cotton cloth padded with this solution was developed with a solution of diazotized 2-methyl-5-nitroaniline which was buffered to a pH between 3 and 5. A dull red dyeing was produced. The developed compound is represented by the formula

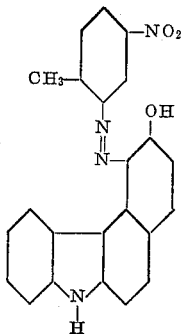

This dye is disclosed in the prior art. A portion of the dyeing was soaped in the usual way by boiling twice for ten minutes in a soap solution consisting of 40 parts of water, 0.08 part of sodium oleate and 0.02 part soda ash per part of cloth. A great deal of the developed compound washed out and a rather weak red-brown dyeing was produced. By extracting like portions of the soaped and unsoaped dyeings with dimethylformamide and determining the amount of dye extracted with a recording spectrophotometer, it was found that 16% of the dye was lost during the above described soaping operation. The light fasteness of the soaped dyeing was found to be only fair while the chlorine fastness was poor.

For the sake of comparison, a portion of the same cotton cloth padded with the alkaline solution of 2-hydroxy-7-benzo-(c)-carbazole, the preparation of which was described above, was developed with a solution of diazotized 2-methyl-4-nitroaniline which was buffered to a pH between 3 and 5. A reddish-brown dyeing was produced. This developed compound is represented by the formula

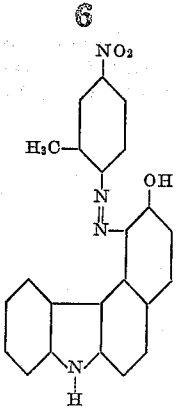

A portion of this dyeing was soaped in the same manner as the foregoing developed dyeing. A beautiful chocolate-brown dyeing was produced. By extracting like weighed portions of the soaped and unsoaped dyeings with dimethyl formamide as described above, it was found that virtually none of the color was lost during the soaping operation. In addition, it was found that the light fasteness and chlorine fastness of the latter soaped dyeing was much superior to that of the former soaped dyeing which was obtained by using diazotized 2-methyl-5-nitroaniline as the azo developing agent.

As illustrative of other members of the class of coupling components which can be used in making the compounds of this invention are 2-hydroxy-10-isopropyl-7-benzo-(c)-carbazole, 2-hydroxy-10-amyl-7-benzo-(c)-carbazole, 2-hydroxy-9-fluoro-7-benzo-(c)-carbazole and 2-hydroxy-8-ethyl-7-benzo-(c)-carbazole. Other examples of suitable diazo components are 4-nitro-2-fluoraniline, 4-nitro-2-isoamylaniline, 4-nitro-2-ethylaniline, 4-nitro-2-isopropoxy-aniline, 4-nitro-2-ethoxyaniline, 4-nitro-2-amyloxyaniline and 4-nitro-2-isoamylaniline.

From the foregoing disclosure it will be recognized that the invention is susceptible of modification without departing from the spirit and scope thereof and it is to be understood that the invention is not restricted to the specific illustrations thereof herein set forth.

I claim:

1. A water-insoluble azo compound in which the diazo of one of the group consisting of 4-nitroaniline and the derivatives thereof in which the 2-position of the benzene ring is occupied by one of the group consisting of alkyl having 1 to 5 carbons, the corresponding alkoxy groups, chloro and fluoro, is coupled with a coupling component represented by the formula

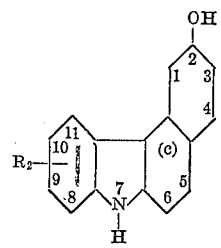

in which $R_2$ is one of the group consisting of hydrogen, alkyl having 1 to 5 carbons, phenyl, chlorine and fluorine, the coupling being in the position marked by the numeral 1.

2. A water-insoluble monazo compound in which the diazo of 4-nitroaniline is coupled with 2-hydroxy-7-benzo-(c)-carbazole, the coupling being in the 1-position of the carbazole.

3. A water-insoluble monazo compound in which the diazo of 5-nitro-2-amino anisole is coupled with 2-hydroxy-7-benzo-(c)-carbazole, the coupling being in the 1-position of the carbazole.

4. A water insoluble monazo compound in which the diazo of 5-nitro-2-amino-toluene is coupled with 2-hydroxy-7-benzo-(c)-carbazole, the coupling being in the 1-position of the carbazole.

5. Textile fiber dyed with a monazo compound formed on the fiber in which the diazo of one of the group consisting of 4-nitro-aniline and the derivatives thereof in which the 2-position of the benzene ring is occupied by alkyl having 1 to 5 carbons, the corresponding alkoxy groups, chloro and fluoro, is coupled with a coupling component represented by the formula

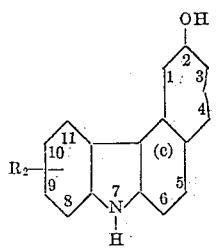

in which $R_2$ is one of the group consisting of hydrogen, alkyl having 1 to 5 carbons, phenyl, chlorine and fluorine, the coupling being in the position marked by the numeral 1.

6. Textile fiber dyed with the monazo compound formed on the fiber by coupling the diazo of 4-nitroaniline with 2-hydroxy-7-benzo-(c)-carbazole in the one position of said carbazole.

7. Textile fiber dyed with the monazo compound formed on the fiber by coupling the diazo of 5-nitro-2-amino-anisole with 2-hydroxy-7-benzo-(c)-carbazole in the one position of said carbazole.

8. Textile fiber dyed with the monazo compound formed on the fiber by coupling the diazo of 5-nitro-2-amino-toluene with 2-hydroxy-7-benzo-(c)-carbazole in the one position of said carbazole.

9. The process of dyeing textile fiber which comprises coupling on the fiber the diazo of one of the group consisting of 4-nitroaniline and the 2-alkyl, -2-alkoxy-, -2-fluoro- and -2-chloro derivatives thereof in which alkyl and alkoxy have 1 to 5 carbons, with a coupling component represented by the formula

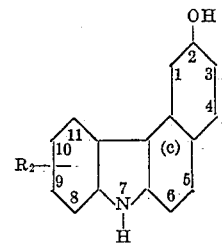

in which $R_2$ is one of the group consisting of hydrogen, alkyl having 1 to 5 carbons, phenyl and fluorine; said coupling being made in the position indicated by the numeral 1.

10. The process in accordance with claim 9 in which the textile fiber is first padded with a solution of the coupling component and dried; and then a buffered solution of the diazo of an aniline of claim 9 is applied; said buffered solution having a pH value of about 3 to about 5.

JOSEPH H. TREPAGNIER.

REFERENCES CITED

The following references are of record in the file of this patent:

UNITED STATES PATENTS

| Number | Name | Date |
| --- | --- | --- |
| 1,766,434 | Grimmel | June 24, 1930 |
| 2,088,506 | Chambers | July 27, 1937 |
| 2,373,926 | Trepagnier | Apr. 17, 1945 |
| 2,416,187 | Maynard et al. | Feb. 18, 1947 |

Certificate of Correction

Patent No. 2,499,800 — March 7, 1950

JOSEPH H. TREPAGNIER

It is hereby certified that errors appear in the printed specification of the above numbered patent requiring correction as follows:

Column 3, line 32, for "Example 2" read *Example 16*; column 4, line 8, for "Example 3" read *Example 17*; line 69, for "Example 4" read *Example 18*; column 5, line 20, for "Example 5" read *Example 19*; column 6, line 25, for "fasteness" read *fastness*;

and that the said Letters Patent should be read with these corrections therein that the same may conform to the record of the case in the Patent Office.

Signed and sealed this 6th day of June, A. D. 1950.

[SEAL]

THOMAS F. MURPHY,
*Assistant Commissioner of Patents.*